US012260839B2

(12) United States Patent
Su

(10) Patent No.: US 12,260,839 B2
(45) Date of Patent: Mar. 25, 2025

(54) DISPLAY DEVICE AND METHOD OF OSD MENU

(71) Applicants: Haining ESWIN IC Design Co., Ltd., Zhejiang (CN); Beijing ESWIN Computing Technology Co., Ltd., Beijing (CN)

(72) Inventor: Shaogang Su, Zhejiang (CN)

(73) Assignees: Haining ESWIN IC Design Co., Ltd., Haining (CN); Beijing ESWIN Computing Technology Co., Ltd., Beijing (CN)

( * ) Notice: Subject to any disclaimer, the term of this patent is extended or adjusted under 35 U.S.C. 154(b) by 114 days.

(21) Appl. No.: 18/146,993

(22) Filed: Dec. 27, 2022

(65) Prior Publication Data

US 2023/0132483 A1 May 4, 2023

(30) Foreign Application Priority Data

Aug. 31, 2022 (CN) ........................ 202211054889.2

(51) Int. Cl.
*G09G 5/02* (2006.01)
*G06F 3/048* (2013.01)
(Continued)

(52) U.S. Cl.
CPC ....... *G09G 5/02* (2013.01); *G09G 2340/0492* (2013.01)

(58) Field of Classification Search
CPC .. G09G 5/02; G09G 5/04; G09G 5/08; G09G 5/022; G09G 5/227; G09G 5/30;
(Continued)

(56) References Cited

U.S. PATENT DOCUMENTS

| | | | | |
|---|---|---|---|---|
| 2007/0150824 A1* | 6/2007 | Tian | ........................ | G09G 5/003 715/764 |
| 2020/0409502 A1* | 12/2020 | Li | ........................ | G06F 3/0482 |
| 2021/0334117 A1* | 10/2021 | Hsieh | ........................ | G06F 9/451 |

FOREIGN PATENT DOCUMENTS

| | | | |
|---|---|---|---|
| CN | 200710074518.X | 8/2012 | |
| CN | 113255656 A * | 8/2021 | ............ H04N 21/47 |

(Continued)

*Primary Examiner* — Wesner Sajous

(57) ABSTRACT

The present application discloses a display device and method of an OSD menu. The device of the present application comprises: a receiving unit for receiving a target operation instruction; a first determination unit for determining a target rotation angle corresponding to the target display apparatus; an acquisition unit for acquiring an attribute information set corresponding to an OSD menu according to the target rotation angle, the OSD menu containing a plurality of target areas, and the attribute information set comprising target position information corresponding to the OSD menu and attribute information corresponding to each of the target areas; a second determination unit for sequentially determining an RGB value corresponding to each of the pixel points contained in the OSD menu according to a preset rule, the target rotation angle, the target operation instruction and the attribute information corresponding to each of the target areas; and an output display unit for outputting and displaying the OSD menu according to the target position information corresponding to the OSD menu and the RGB value corresponding to each of the pixel points contained in the OSD menu.

12 Claims, 2 Drawing Sheets

(51) Int. Cl.

| | |
|---|---|
| ***G06V 10/42*** | (2022.01) |
| ***G09G 5/04*** | (2006.01) |
| ***G09G 5/30*** | (2006.01) |
| ***H04N 1/60*** | (2006.01) |
| ***H04N 5/57*** | (2006.01) |
| ***H04N 9/64*** | (2023.01) |

(58) Field of Classification Search

CPC ............ G09G 5/32; G09G 2340/0492; G09G 2340/12; G09G 2320/0606; G09G 2320/06; G09G 2320/08; H04N 1/60; H04N 5/57–58; H04N 9/64–69; H04N 21/431; H04N 21/47; H04N 21/44016; H04N 21/4858; H04N 21/485; G06F 3/04812; G06F 3/04842; G06F 3/04883; G06F 3/04897; G06F 3/0482; G06F 3/0489; G06F 3/04892; G06F 9/451; G06V 10/42; G06V 20/10; G06V 20/62; G06T 11/001; G06T 2207/10002

See application file for complete search history.

(56) References Cited

FOREIGN PATENT DOCUMENTS

| | | | | | |
|---|---|---|---|---|---|
| CN | 109271076 B | * | 1/2022 | ........... | G06F 3/0481 |
| CN | 114125538 A | * | 3/2022 | | |
| CN | 202111591430.1 | | 3/2022 | | |
| KR | 20060069625 A | * | 12/2004 | | |

* cited by examiner

DISPLAY DEVICE AND METHOD OF OSD MENU

CROSS REFERENCE OF RELATED APPLICATION

This application claims priority to Chinese Patent Application No.CN2022110548892, titled "DISPLAY DEVICE AND METHOD OF OSD MENU" and filed to the China National Intellectual Property Administration, the entire contents of which are incorporated herein by reference.

TECHNICAL FIELD

The present application relates to the technical field of OSD menus, and in particular, to a display device and method for an OSD menu.

BACKGROUND ART

OSD (On-Screen Display) is mainly used on CRT, LCD and other display apparatuses. After the user presses the menu key of the display apparatus, an OSD menu containing information about each adjustment item of the display apparatus will pop up on the screen of the display apparatus, and the user can adjust parameters, such as color and brightness, of the display apparatus via the OSD menu so as to enable the display apparatus to reach an optimal use state.

Currently, in order to improve the user's experience, many display apparatuses are provided with a rotation function. However, after the display apparatus rotates, the OSD menu will still maintain the original display state, so that the display direction of the screen of the display apparatus is inconsistent with the display direction of the OSD menu, so that when a user adjusts the parameters of the display apparatus, such as color and brightness, via the OSD menu, the operation is very inconvenient, resulting in a poor user experience.

SUMMARY OF THE INVENTION

Embodiments of the present application provide a display device and method of an OSD menu, and a main object thereof is to change a display state of the OSD menu after the display device rotates so as to improve a user's use experience.

In order to solve the above-mentioned technical problem, the embodiments of the present application provide the following technical solutions.

In a first aspect, the present application provides a display device of an OSD menu, the device being applied to a target display apparatus, the device comprising:

a receiving unit for receiving a target operation instruction;

a first determination unit for determining a target rotation angle corresponding to the target display apparatus;

an acquisition unit for acquiring an attribute information set corresponding to the OSD menu according to the target rotation angle, the OSD menu containing a plurality of target areas, each of the target areas containing a plurality of pixel points, the attribute information set comprising target position information corresponding to the OSD menu and attribute information corresponding to each of the target areas, and the target position information corresponding to the OSD menu being used for indicating the position of the OSD menu in a screen of the target display apparatus when a rotation angle of the target display apparatus is the target rotation angle; a second determination unit for successively determining an RGB value corresponding to each of the pixel points contained in the OSD menu according to a preset rule, the target rotation angle, the target operation instruction and attribute information corresponding to each of the target areas; and an output display unit for outputting and displaying the OSD menu according to the target position information corresponding to the OSD menu and the RGB value corresponding to each of the pixel points contained in the OSD menu.

Optionally, the attribute information corresponding to the target area comprises a plurality of storage addresses corresponding to the target area; and the second determination unit includes: a first determination circuit for determining a target storage address corresponding to each of the pixel points contained in the OSD menu according to the target operation instruction and the plurality of storage addresses corresponding to each of the target areas;

a second determination circuit for determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and a third determination circuit for sequentially determining the RGB value corresponding to each of the pixel points contained in the OSD menu according to the search order and the target storage address corresponding to each of the pixel points contained in the OSD menu.

Optionally, the first determination circuit is specifically used for:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each of the the target areas.

Optionally, the second determination circuit is specifically used for:

acquiring the initial arrangement order corresponding to the plurality of target areas and the initial arrangement order corresponding to the plurality of pixel points contained in each of the target areas;

determining a rotation arrangement order corresponding to the plurality of target areas according to the initial arrangement order corresponding to the plurality of target areas and the target rotation angle;

respectively determining the rotation arrangement order corresponding to the plurality of pixel points contained in each of the target areas according to the initial arrangement order corresponding to the plurality of pixel points contained in each of the target areas and the target rotation angle; and determining the search order corresponding to the plurality of pixel points contained in the OSD menu according to the rotation arrangement order corresponding to the plurality of target areas and the rotation arrangement order corresponding to the plurality of pixel points contained in each of the target areas.

Optionally, the attribute information corresponding to the target area further comprises a color bit depth value corresponding to the target area, and the attribute information set further comprises a color disk corresponding to each color bit depth value; and the third determination circuit is specifically used for:

successively searching for a color numerical value corresponding to each of the pixel points contained in the OSD menu in a target random access memory according to the search order and the target storage address corresponding to each of the pixel points contained in the OSD menu; and after searching for and obtaining the color numerical value corresponding to any of the pixel points, determining the color disk corresponding to the target area to which the pixel point belongs according to the color bit depth value corresponding to the target area to which the pixel point belongs, and searching for the RGB value corresponding to the pixel point in the color disk corresponding to the target area to which the pixel point belongs according to the color numerical value corresponding to the pixel point.

In a second aspect, the present application also provides a display method of an OSD menu, the method being applied to a target display apparatus, the method comprising:

receiving a target operation instruction;

determining a target rotation angle corresponding to the target display apparatus;

acquiring an attribute information set corresponding to the OSD menu according to the target rotation angle, the OSD menu containing a plurality of target areas, each of the target areas containing a plurality of pixel points, the attribute information set comprising target position information corresponding to the OSD menu and attribute information corresponding to each of the target areas, and the target position information corresponding to the OSD menu being used for indicating the position of the OSD menu in a screen of the target display apparatus when a rotation angle of the target display apparatus is the target rotation angle;

successively determining an RGB value corresponding to each of the pixel points contained in the OSD menu according to a preset rule, the target rotation angle, the target operation instruction and attribute information corresponding to each of the target areas; and outputting and displaying the OSD menu according to the target position information corresponding to the OSD menu and the RGB value corresponding to each of the pixel points contained in the OSD menu.

Optionally, the attribute information corresponding to the target area comprises a plurality of storage addresses corresponding to the target area; and the successively determining an RGB value corresponding to each of the pixel points contained in the OSD menu according to a preset rule, the target rotation angle, the target operation instruction and attribute information corresponding to each of the target areas comprises:

determining a target storage address corresponding to each of the pixel points contained in the OSD menu according to the target operation instruction and the plurality of storage addresses corresponding to each of the target areas;

determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and sequentially determining the RGB value corresponding to each of the pixel points contained in the OSD menu according to the search order and the target storage address corresponding to each of the pixel points contained in the OSD menu.

Optionally, the determining a target storage address corresponding to each of the pixel points contained in the OSD menu according to the target operation instruction and the plurality of storage addresses corresponding to each of the target areas comprises:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each of the the target areas. Optionally, the determining a search order corresponding to each of the pixel points contained in the OSD menu according to an initial arrangement order corresponding to the plurality of target areas, an initial arrangement order corresponding to the plurality of pixel points contained in each of the target areas and the target rotation angle comprises:

acquiring the initial arrangement order corresponding to the plurality of target areas and the initial arrangement order corresponding to the plurality of pixel points contained in each of the target areas;

determining a rotation arrangement order corresponding to the plurality of target areas according to the initial arrangement order corresponding to the plurality of target areas and the target rotation angle;

respectively determining the rotation arrangement order corresponding to the plurality of pixel points contained in each of the target areas according to the initial arrangement order corresponding to the plurality of pixel points contained in each of the target areas and the target rotation angle; and determining the search order corresponding to the plurality of pixel points contained in the OSD menu according to the rotation arrangement order corresponding to the plurality of target areas and the rotation arrangement order corresponding to the plurality of pixel points contained in each of the target areas.

Optionally, the attribute information corresponding to the target area further comprises a color bit depth value corresponding to the target area, and the attribute information set further comprises a color disk corresponding to each color bit depth value; and the sequentially determining the RGB value corresponding to each of the pixel points contained in the OSD menu according to the search order and the target storage address, determined according to the target rotation angle, corresponding to each of the pixel points contained in the OSD menu comprises:

successively searching for a color numerical value corresponding to each of the pixel points contained in the OSD menu in a target random access memory according to the search order and the target storage address corresponding to each of the pixel points contained in the OSD menu; and after searching for and obtaining the color numerical value corresponding to any of the pixel points, determining the color disk corresponding to the target area to which the pixel point belongs according to the color bit depth value corresponding to the target area to which the pixel point belongs, and searching for the RGB value corresponding to the pixel point in the color disk corresponding to the target area to which the pixel point belongs according to the color numerical value corresponding to the pixel point.

In a third aspect, an embodiment of the present application provides a storage medium comprising a stored program, wherein an apparatus on which the storage medium is located is controlled to execute the display method of an OSD menu of the second aspect when the program is executed.

In a fourth aspect, an embodiment of the present application provides a display device of an OSD menu, the device comprising a storage medium; and one or more processors, the storage medium being coupled to the processors, the processors being configured to execute program instructions stored in the storage medium, the program instructions, when executed, performing the display method of an OSD menu of the second aspect.

With the above-mentioned technical solution, the technical solution provided by the present application has at least the following advantages.

The present application provides a display device and method of an OSD menu, and the display device of an OSD menu provided in the present application comprises: a receiving unit, a first determination unit, an acquisition unit, a second determination unit and an output display unit; firstly, after a user presses a menu key of a target display apparatus, rotates the target display apparatus or performs other operations so as to generate a target operation instruction, the receiving unit receives the target operation instruction; secondly, the first determination unit determines the target rotation angle corresponding to the target display apparatus; thirdly, the acquisition unit acquires the attribute information set corresponding to the OSD menu in the attribute random access memory according to the target rotation angle corresponding to the target display apparatus; fourthly, the second determination unit sequentially determines an RGB value corresponding to each of the pixel points contained in the OSD menu according to the preset rule, the target rotation angle corresponding to the target display apparatus, the received target operation instruction and the attribute information corresponding to each of the target areas contained in the attribute information set; finally, the output display unit outputs and displays the OSD menu according to the target position information corresponding to the OSD menu and the RGB value corresponding to each of the pixel points contained in the OSD menu. In the present application, after the target display apparatus rotates, the display state of the OSD menu can be changed so as to ensure that the display direction of the screen of the target display apparatus is consistent with the display direction of the OSD menu, and thus the user's use experience can be effectively improved.

The foregoing description is merely an overview of the technical solution of the present application, which can be implemented according to the contents of the description in order to enable the technical means of the present application to be more clearly understood, and in order to enable the above-mentioned and other objects, features and advantages of the present application to be more clearly understood, particular embodiments of the present application are set forth below.

BRIEF DESCRIPTION OF THE DRAWINGS

The above-mentioned and other objects, features and advantages of exemplary embodiments of the present application will be readily understood by reading the following detailed description with reference to the accompanying drawings. Embodiments of the present application are illustrated by way of example, and not by way of limitation, in the drawings, wherein like reference numerals refer to similar or corresponding parts.

DETAILED DESCRIPTION OF THE INVENTION

Exemplary embodiments of the present application will be described in more detail below with reference to the accompanying drawings. While the drawings show exemplary embodiments of the present application, it should be understood that the application may be embodied in various forms and should not be construed as limited to the embodiments set forth herein. Rather, these embodiments are provided so that this disclosure will be thorough and complete, and will fully convey the scope of the disclosure to those skilled in the art.

It should be noted that, unless otherwise indicated, technical or scientific terms used herein shall have the ordinary meaning as understood by one of ordinary skill in the art to which this application belongs.

Figure 1:
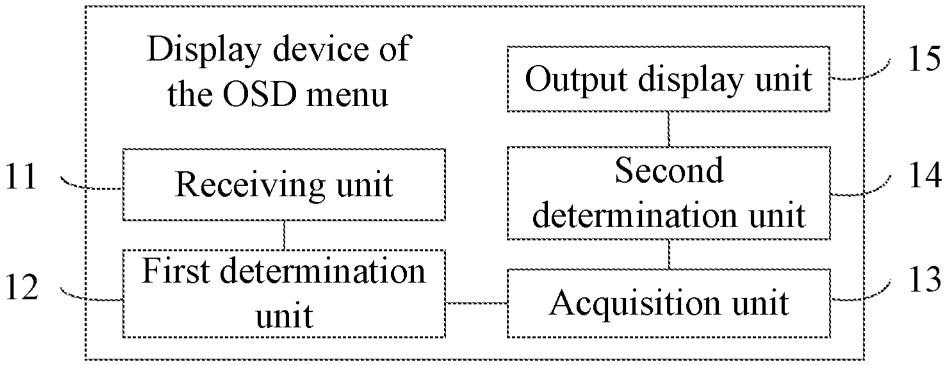
FIG. 1 is a block diagram showing a constitution of a display device of an OSD menu provided in an embodiment of the present application.

The embodiment of the present application provides a display device for an OSD menu, and the device is applied to a target display apparatus, wherein the device is specifically applied to a control integrated circuit chip in the target display apparatus, and the target display apparatus can be, but is not limited to a display, a television, etc. As shown in FIG. 1, the device specifically comprises: a receiving unit 11 for receiving a target operation instruction; a first determination unit 12 for determining a target rotation angle corresponding to the target display apparatus; an acquisition unit 13 for acquiring an attribute information set corresponding to a OSD menu according to the target rotation angle, wherein the OSD menu contains a plurality of target areas, and each of the target areas containing a plurality of pixel points, the attribute information set comprising target position information corresponding to the OSD menu and attribute information corresponding to each of the target areas, the target position information corresponding to the OSD menu being used for indicating the position of the OSD menu in a screen of the target display apparatus when a rotation angle of the target display apparatus is the target rotation angle; a second determination unit 14 for sequentially determining an RGB value corresponding to each of the pixel points contained in the OSD menu according to a preset rule, the target rotation angle, the target operation instruction and attribute information corresponding to each of the target areas; and an output display unit 15 for outputting and displaying the OSD menu according to the target position information corresponding to the OSD menu and the RGB value corresponding to each of the pixel points contained in the OSD menu.

A detailed process of the display device output of the OSD menu to display the OSD menu will be described in detail below in conjunction with the display device of the OSD menu shown in FIG. 1.

The target operation instruction may be, but is not limited to a corresponding operation instruction generated by the user pressing a menu key of the target display apparatus, or a corresponding operation instruction generated by the user rotating the target display apparatus, etc. The target rotation angle may be, but is not limited to 90° clockwise, 180° clockwise, 270° clockwise, etc. The OSD menu contains multiple target areas, for example, the multiple target areas contained in the OSD menu are A11, A12 . . . A1*n*, A21, A22 . . . A2*n* . . . Am1, Am2 . . . Amn. When the target display apparatus is in an initial state (namely, a non-rotating state), a first target area of the first line of the OSD menu is A11, a second target area of the first line is A12 . . . an nth target area of the first line is A1*n*, a first target area of the second line is A21, a second target area of the second line is A22 . . . an nth target area of the second line is A2*n* . . . a first target area of the mth line is Am1, a second target area of the mth line is Am2 . . . an nth target area of the mth line is Amn, wherein each of the target areas contains a plurality of pixel points, and for any one of the target areas, the plurality of pixel points contained therein are arranged in a matrix form. For example, when a target display apparatus is in an initial state, a first pixel point of the first line of the target area A11 is B11, a second pixel point of the first line is B12 . . . an xth pixel point of the first line is B1*x*, a first pixel point of the second line is B21, a second pixel point of the second line is B22 . . . an xth pixel point of the second line is B2*x* . . . a first pixel point of the yth row is By1, a second pixel point of the yth line is By2 . . . an xth pixel point of the yth line is Byx, wherein the attribute information set comprises target position information corresponding to the OSD menu and attribute information corresponding to each of the target areas. The target position information corresponding to the OSD menu is used for indicating the position of the OSD menu on the screen of the target display apparatus when the rotation angle of the target display apparatus is the target rotation angle, and the target position information corresponding to the OSD menu is specifically the position of the first pixel point of the first line of the OSD menu on the screen of the target display apparatus when the rotation angle of the target display apparatus is the target rotation angle.

In the embodiment of the present application, after a user presses a menu key of a target display apparatus, rotates the target display apparatus or performs other operations so as to generate a target operation instruction, the receiving unit 11 in the display device of the OSD menu may receive and obtain the target operation instruction. After the receiving unit 11 receives the target operation instruction, the first determination unit 12 may determine the target rotation angle corresponding to the target display apparatus, wherein the first determination unit 12 may specifically acquire the target rotation angle corresponding to the target display apparatus according to a preset sensor in the target display apparatus, and the preset sensor may be, but is not limited to, a gyroscope sensor, etc. After the first determination unit 12 determines the target rotation angle corresponding to the target display apparatus, the acquisition unit 13 may acquire the attribute information set corresponding to the OSD menu in the attribute random access memory according to the target rotation angle corresponding to the target display apparatus. After the acquisition unit 13 acquires and obtains the attribute information set corresponding to the OSD menu, the second determination unit 14 may sequentially determine the RGB value corresponding to each of the pixel points contained in the OSD menu according to the preset rule, the target rotation angle corresponding to the target display apparatus, the received target operation instruction and the attribute information corresponding to each of the target areas contained in the attribute information set. Namely, according to the preset rule, the target rotation angle corresponding to the target display apparatus, the target operation instruction and the attribute information corresponding to each of the target areas, firstly an RGB value corresponding to the first pixel point of the first line of the OSD menu when the rotation angle of the target display apparatus is the target rotation angle is determined, and then an RGB value corresponding to the second pixel point of the first line of the OSD menu when the rotation angle of the target display apparatus is the target rotation angle is determined . . . then an RGB value corresponding to the last pixel point of the first line of the OSD menu when the rotation angle of the target display apparatus is the target rotation angle is determined, and then an RGB value corresponding to the first pixel point of the second line of the OSD menu when the rotation angle of the target display apparatus is the target rotation angle is determined, then an RGB value corresponding to the second pixel point of the second line of the OSD menu when the rotation angle of the target display apparatus is the target rotation angle is determined . . . then an RGB value corresponding to the last pixel point of the second line of the OSD menu when the rotation angle of the target display apparatus is the target rotation angle is determined . . . and finally an RGB value corresponding to the last pixel point of the last line of the OSD menu when the rotation angle of the target display apparatus is the target rotation angle is determined. After the second determination unit 14 successively determines the RGB value corresponding to each of the pixel points contained in the OSD menu when the rotation angle of the target display apparatus is the target rotation angle, the output display unit 15 can output and display the OSD menu according to the target position information corresponding to the OSD menu and the RGB value corresponding to each of the pixel points contained in the OSD menu, that is to say, after the second determination unit 14 determines the RGB value corresponding to the first pixel point of the first line of the OSD menu, the output display unit 15 can output and display the first pixel of the first line of the OSD menu according to the target position information (namely, the position of the first pixel of the first line of the OSD menu in the screen of the target display apparatus) corresponding to the OSD menu and the RGB value corresponding to the first pixel of the first line of the OSD menu. After the second determination unit 14 determines the RGB value corresponding to the second pixel of the first line of the OSD menu, the output display unit 15 can firstly determine the position of the second pixel point of the first line of the OSD menu in the screen of the target display apparatus according to the target position information corresponding to the OSD menu, then output and display the second pixel point of the first line of the OSD menu according to the position of the second pixel point of the first line of the OSD menu in the screen of the target display apparatus and the RGB value corresponding to the second pixel point of the first line of the OSD menu. After the second determination unit 14 determines the RGB value corresponding to the third pixel point of the first line of the OSD menu, the output display unit 15 can firstly determine the position of the third pixel point of the first line of the OSD menu in the screen of the target display apparatus according to the target position information corresponding to the OSD menu, and then output and display the third pixel point of the first line of the OSD menu according to the position of the third pixel point of the first line of the OSD menu in the screen of the target display apparatus and the RGB value corresponding to the first line third pixel point of the OSD menu . . . After the second determination unit 14 determines the RGB value corresponding to the last pixel point of the last line of the OSD menu, the output display unit 15 can firstly determine the position of the last pixel point of the last line of the OSD menu in the screen of the target display apparatus according to the target position information corresponding to the OSD menu, and then output and display the last pixel point of the last line of the OSD menu according to the position of the last pixel point of the last line of the OSD menu in the screen of the target display apparatus and the RGB value corresponding to the last pixel point of the last line of the OSD menu so as to complete the output and display of the OSD menu. At this moment, the display direction of the screen of the target display apparatus is consistent with the display direction of the OSD menu.

An embodiment of the present application provides a display device for an OSD menu, and the display device for an OSD menu provided in the embodiment of the present application comprises: a receiving unit, a first determination unit, an acquisition unit, a second determination unit and an output display unit. Firstly, after a user presses a menu key of a target display apparatus, rotates the target display apparatus or performs other operations so as to generate a target operation instruction, the receiving unit receives the target operation instruction. Secondly, the first determination unit determines a target rotation angle corresponding to the target display apparatus. Thirdly, the acquisition unit acquires the attribute information set corresponding to the OSD menu in the attribute random access memory according to the target rotation angle corresponding to the target display apparatus. Fourthly, the second determination unit sequentially determines an RGB value corresponding to each of the pixel points contained in the OSD menu according to the preset rule, the target rotation angle corresponding to the target display apparatus, the received target operation instruction and the attribute information corresponding to each of the target areas contained in the attribute information set. Finally, the output display unit outputs and displays the OSD menu according to the target position information corresponding to the OSD menu and the RGB value corresponding to each of the pixel points contained in the OSD menu. In the embodiment of the present application, after the target display apparatus rotates, the display state of the OSD menu can be changed, so as to ensure that the display direction of the screen of the target display apparatus is consistent with the display direction of the OSD menu, and thus the user's use experience can be effectively improved.

Figure 2:
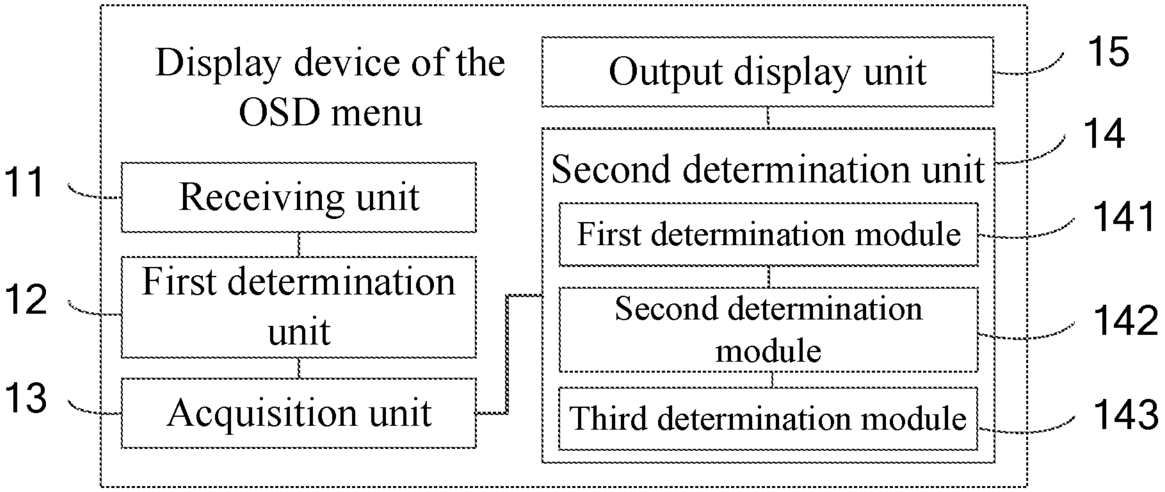
FIG. 2 is a block diagram showing a constitution of another display device of an OSD menu provided in an embodiment of the present application.

The embodiment of the present application also provides another display apparatus for a OSD menu, which is applied to a target display apparatus. As shown in FIG. 2, the following is explained in conjunction with FIG. 2.

Furthermore, as shown in FIG. 2, for any one target area, the attribute information corresponding to the target area comprises a plurality of storage addresses corresponding to the target area, and the second determination unit 14 comprises: a first determination circuit 141 for determining the target storage address corresponding to each of the pixel points contained in the OSD menu according to the target operation instruction and the plurality of storage addresses corresponding to each of the target areas; a second determination circuit 142 for determining a search order corresponding to each of the pixel points contained in the OSD menu according to an initial arrangement order corresponding to the plurality of target areas, an initial arrangement order corresponding to a plurality of pixel points contained in each of the target areas and a target rotation angle; a third determination circuit 143, used for sequentially determining an RGB value corresponding to each of the pixel points contained in the OSD menu according to the search order corresponding to each of the pixel points contained in the OSD menu and the target storage address.

With regard to any target area, the storage address corresponding to the target area is specifically the storage address corresponding to the first pixel point of the first line of the target area when the target display apparatus is in an initial state. According to the storage address corresponding to the first pixel point of the first line of the target area, the storage address corresponding to each of the pixel points contained in the target area can be determined. According to the storage address corresponding to each of the pixel points contained in the target area, the storage address corresponding to each of the pixel points can be searched in the target random access memory to obtain a color numerical value corresponding to each of the pixel points contained in the target area when the target display apparatus is in the initial state. For any one color bit depth, the color numerical value corresponding to each RGB value under the color bit depth is preset, and a mapping relationship between each RGB value under the color bit depth and the color numerical value corresponding thereto is added to the color disk corresponding to the color bit depth. Therefore, for any one pixel point, after determining the color disk corresponding to the target area to which the pixel point belongs according to the color bit depth value corresponding to the target area to which the pixel point belongs, the RGB value corresponding to the pixel point can be found in the color disk corresponding to the target area to which the pixel point belongs according to the color numerical value corresponding to the pixel point.

It should be noted that, since, for any one pixel point, the data volume of the color numerical value corresponding to the pixel point is smaller than the data volume of the RGB value corresponding to the pixel point, compared with directly storing the RGB value corresponding to each of the pixel points included in each of the target areas into the target random access memory, storing the color numerical value corresponding to each of the pixel points included in each of the target areas into the target random access memory can reduce the occupation of the storage space of the target random access memory.

In the embodiment of the present application, according to a preset rule, the target rotation angle corresponding to the target display apparatus, a received target operation instruction and attribute information corresponding to each of the target areas contained in the attribute information set, the second determination unit 14 successively determines a RGB value corresponding to each of the pixel points contained in the OSD menu as follows. Firstly, a first determination circuit 141 determines a target storage address corresponding to each of the pixel points contained in the OSD menu according to a target operation instruction and a plurality of storage addresses corresponding to each of the target areas, wherein when receiving different operation instructions, a display device of the OSD menu needs to control the OSD menu to display different contents. Therefore, according to the target operation instruction, it is possible to determine the contents required to be displayed for each of the target areas contained in the OSD menu, namely, for any one target area, according to the target operation instruction, it can be determined that the color numerical value corresponding to each of the pixel points contained in the target area should be searched in the target random access memory according to which storage address of the plurality of storage addresses corresponding to the target area. Then the second determination circuit 142 determines a search order corresponding to each of the pixel points contained in the OSD menu according to the initial arrangement order corresponding to the plurality of target areas, the initial arrangement order corresponding to the plurality of pixel points contained in each of the target areas and the target rotation angle, wherein the initial arrangement order corresponding to the plurality of target areas is the arrangement order corresponding to the plurality of target areas when the target display apparatus is in an initial state (which target area is the first target area of the first line of the OSD menu, which target area is the second target area of the first line of the OSD menu . . . ). With regard to any one target area, the initial arrangement order corresponding to the plurality of pixel points contained in the target area is the arrangement order corresponding to the plurality of pixel points contained in the target area when the target display apparatus is in an initial state (which pixel point is the first pixel point of the first line of the target area, which pixel point is the second pixel point of the first line of the target area.) Finally, the third determination circuit 143 sequentially determines the RGB value corresponding to each of the pixel points contained in the OSD menu according to the search order corresponding to each of the pixel points contained in the OSD menu and the target storage address.

Furthermore, as shown in FIG. 2, the specific process of the first determination circuit 141 determining the target storage address corresponding to each of the pixel points contained in the OSD menu according to the target operation instruction and a plurality of storage addresses corresponding to each of the target areas is as follows.

Firstly the target storage address corresponding to each of the target areas is determined according to a target operation instruction and the plurality of storage addresses corresponding to each of the target areas, that is to say, for any target area, firstly, it is determined according to the target operation instruction, which storage address of the plurality of storage addresses corresponding to the target area should be used to search for the color numerical value corresponding to each of the pixel points contained in the target area in a target random access memory, and then the selected storage address is determined as the target storage address corresponding to the target area. Secondly, the target storage address corresponding to each of the pixel points contained in the OSD menu is determined according to the target storage address corresponding to each of the target areas, namely, the target storage address corresponding to each of the pixel points contained in each area when the target display apparatus is in an initial state is determined.

Furthermore, as shown in FIG. 2, the specific process of the second determination circuit 142 determining the search order corresponding to each of the pixel points contained in the OSD menu according to the initial arrangement order corresponding to the plurality of target areas, the initial arrangement order corresponding to the plurality of pixel points contained in each of the target areas and the target rotation angle is as follows.

First, an initial arrangement order corresponding to a plurality of target areas and the initial arrangement order corresponding to a plurality of pixel points contained in each of the target areas are acquired.

Secondly, according to the initial arrangement order and the target rotation angle corresponding to the plurality of target areas, the rotation arrangement order corresponding to the plurality of target areas is determined, namely, according to the initial arrangement order and the target rotation angle corresponding to the plurality of target areas, the arrangement order corresponding to the plurality of target areas when the rotation angle of the target display apparatus is the target rotation angle is determined.

For example, the multiple target areas contained in the OSD menu are A11, A12 . . . A15, A21, A22 . . . A25 . . . A41, A42 . . . A45, and when the target display apparatus is in an initial state, the corresponding initial arrangement order of the multiple target areas is like that the first target area of the first line of the OSD menu is A11, the second target area of the first line is A12 . . . the fifth target area of the first line is A15, the first target area of the second line is A21, the second target area of the second line is A22 . . . the fifth target area of the second line is A25 . . . the first target area of the fourth line is A41, the second target area of the fourth line is A42 . . . the fifth target area of the fourth line is A45. When the rotation angle of the target display apparatus is 90° (namely, the target rotation angle is 90°), the corresponding rotation arrangement order of multiple target areas is like that the first target area of the first line of the OSD menu is A15, the second target area of the first line is A25 . . . the fourth target area of the first line is A45, the first target area of the second line is A14, the second target area of the second line is A24 . . . the fourth target area of the second line is A44 . . . the first target area of the fifth line is A11, the second target area of the fifth line is A21 . . . the fourth target area of the fifth line is A41.

Again, according to the initial arrangement order and the target rotation angle corresponding to the plurality of pixel points contained in each of the target areas, respectively the rotation arrangement order corresponding to the plurality of pixel points contained in each of the target areas is determined, namely, for any one target area, according to the initial arrangement order and the target rotation angle corresponding to the plurality of pixel points contained in the target area, the arrangement order corresponding to the plurality of pixel points contained in the target area when the rotation angle of the target display apparatus is the target rotation angle is determined.

For example, with regard to any one target area, the plurality of pixel points contained in the target area are B11, B12 . . . B16, B21, B22 . . . B26 . . . B71, B72 . . . B76, and when the target display apparatus is in an initial state, the initial arrangement order corresponding to the plurality of pixel points is like that the first pixel point of the first line of the target area is B11, the second pixel point of the first line is B12 . . . the sixth pixel point of the first line is B16, the first pixel point of the second line is B21, the second pixel point of the second line is B22 . . . the sixth pixel point of the second line is B26 . . . the first pixel point of the seventh line is B71, the second pixel point of the seventh line is B72 . . . the sixth pixel point of the seventh line is B76. When the rotation angle of the target display apparatus is 90° (namely, the target rotation angle is 90°), the rotation arrangement order corresponding to a plurality of pixel points is like that the first pixel point of the first line of the target area is B16, the second pixel point of the first line is B26 . . . the seventh pixel point of the first line is B76, the first pixel point of the second row is B15, the second pixel point of the second row is B25 . . . the seventh pixel point of the second row is B75 . . . the first pixel point of the sixth row is B11, and the second pixel point of the sixth row is B21 . . . the seventh pixel point of the sixth row is B71.

Finally, the search order corresponding to the plurality of pixel points contained in the OSD menu is determined according to the rotation arrangement order corresponding to the plurality of target areas and the rotation arrangement order corresponding to the plurality of pixel points contained in each of the target areas.

For example, when the rotation angle of the target display apparatus is 90° (namely, the target rotation angle is 90°), the search order corresponding to a plurality of pixel points contained in the OSD menu is like that the first pixel point of the first line of the first target area of the first line of the OSD menu, the second pixel point of the first line of the first target area of the first line of the OSD menu . . . the last pixel points of the first line of the first target area of the first line of the OSD menu, the first pixel point of the first line of the second target area of the first line of the OSD menu, the second pixel point of the first line of the second target area of the first line of the OSD menu . . . the last pixel point of the first line of the second target area of the first line of the OSD menu . . . the first pixel point of the first line of the last target area of the first line of the OSD menu, the second pixel point of the first line of the last target area of the first line of the OSD menu . . . the last pixel point of the first line of the last target area of the first line of the OSD menu, the first pixel point of the second line of the first target area of the first line of the OSD menu, the second pixel point of the second line of the first target area of the first line of the OSD menu . . . the last pixel point of the second line of the first target area of the first line of the OSD menu, the first pixel point of the second line of the second target area of the first line of the OSD menu, the second pixel point of the second line of the second target area of the first line of the OSD menu . . . the last pixel point of the second line of the second target area of the first line of the OSD menu . . . the first pixel point of the second line of the last target area of the first line of the OSD menu, the second pixel point of the second line of the last target area of the first line of the OSD menu . . . the last pixel point of the second line of the last target area of the first line of the OSD menu.

Furthermore, as shown in FIG. 2, the attribute information corresponding to the target area also comprises a color bit depth value corresponding to the target area, and the attribute information set also comprises a color disk corresponding to each color bit depth value. The specific process of the third determination circuit 143 sequentially determining the RGB value corresponding to each of the pixel points contained in the OSD menu according to the search order and the target storage address corresponding to each of the pixel points contained in the OSD menu is as follows.

According to a search order corresponding to each of the pixel points contained in the OSD menu and a target storage address, a color numerical value corresponding to each of the pixel points contained in the OSD menu in a target random access memory is successively searched for.

After searching for and obtaining a color numerical value corresponding to any one pixel point, the color disk corresponding to the target area to which the pixel point belongs is determined according to the color bit depth value corresponding to the target area to which the pixel point belongs, and the RGB value corresponding to the pixel point in the color disk corresponding to the target area to which the pixel point belongs is searched for according to the color numerical value corresponding to the pixel point.

Figure 3:
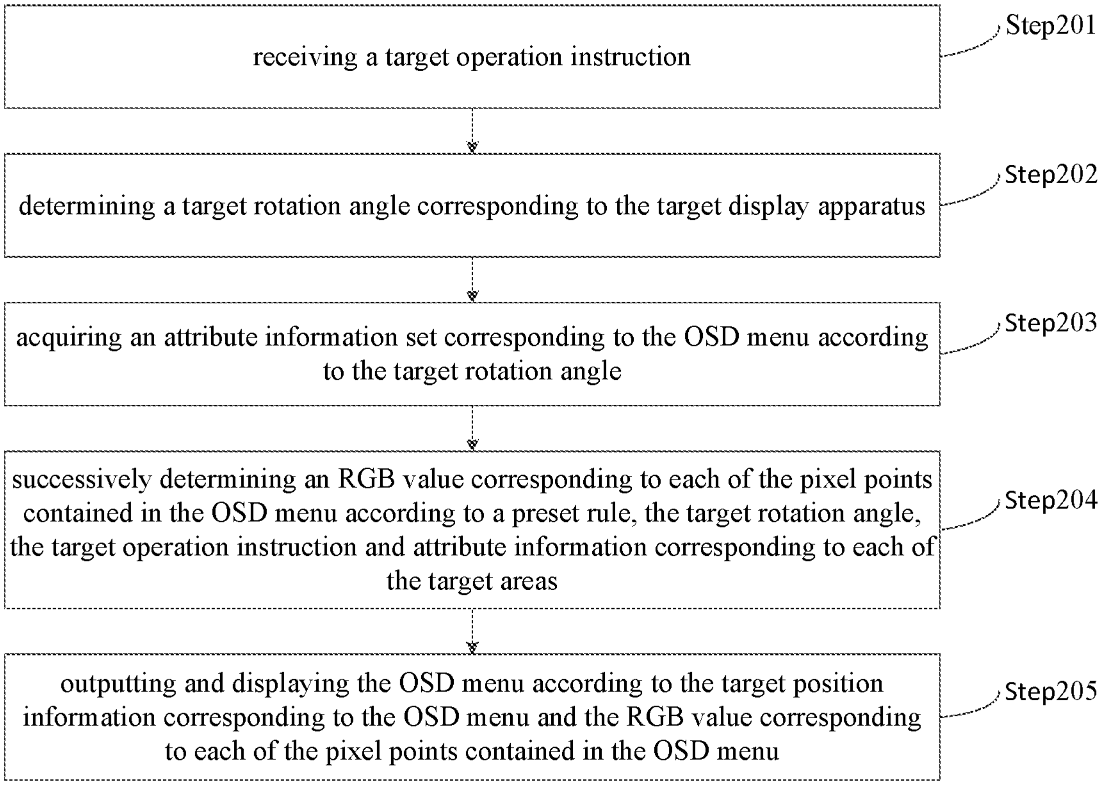
FIG. 3 is a flowchart illustrating a display method of an OSD menu provided in an embodiment of the present application.

It needs to be explained that, in a practical application process, the storage format of the target random access memory can be adjusted according to the color bit depth value corresponding to each of the target areas, the number of pixel points contained in each line of each of the target areas and the specific situation of the control integrated circuit chip, for example, one address in the target random access memory contains three bytes. When the color bit depth value corresponding to a certain target area is 1 bit, one address in the target random access memory can store the color numerical value corresponding to 24 pixel points contained in the target area. When the color bit depth value corresponding to a certain target area is 2 bit, an address in the target random access memory can store a color numerical value corresponding to 12 pixel points contained in the target area. When the color bit depth value corresponding to a certain target area is 4 bit, an address in the target random access memory can store a color numerical value corresponding to 6 pixel points contained in the target area. Therefore, when the color bit depth value corresponding to a certain target area is 2 bit, each line of the target area contains 12 pixel points. One address can be read by each clock of the control integrated circuit chip, and the control integrated circuit chip needs to output and display two pixel points by each clock. In order to ensure that the control integrated circuit chip can display two pixel points at each clock output, it is necessary to store a color numerical value corresponding to the first six pixel points of the first line of the target area and a color numerical value corresponding to the first six pixel points of the second line in an address, store a color numerical value corresponding to the last six pixel points of the first line of the target area and a color numerical value corresponding to the last six pixel points of the second line in an address, and store a color numerical value corresponding to the first six pixel points of the third line of the target area and a color numerical value corresponding to the first six pixel points of the fourth line in an address. The color numerical value corresponding to the last 6 pixel points of the third line and the color numerical value corresponding to the last 6 pixel points of the fourth line of the target area are stored in an address. Furthermore, as an implementation of the above-mentioned device shown in FIGS. 1 and 2, another embodiment of the present application also provides a display method of a OSD menu, wherein the method is applied to a target display apparatus, wherein the method is specifically applied to a control integrated circuit chip in the target display apparatus, and the target display apparatus can be, but is not limited to displays, televisions, etc. This embodiment of the method corresponds to the embodiment of the device described above, and in order to facilitate reading, the embodiment of the method will not be described in detail in the embodiment of the device described above, but it should be clear that the method of the embodiment of the method can correspond to all the embodiments of the device described above. The method is applied to change the display state of the OSD menu after the display device rotates so as to improve the user's use experience, and specifically as shown in FIG. 3, the method comprises step 201-step 205:

Step 201, receiving a target operation instruction;

Step 202, determining a target rotation angle corresponding to the target display apparatus;

Step 203, acquiring an attribute information set corresponding to the OSD menu according to the target rotation angle;

wherein the OSD menu comprises a plurality of target areas, and each of the target areas comprises a plurality of pixel points; the attribute information set comprises target position information corresponding to the OSD menu and attribute information corresponding to each of the target areas; and the target position information corresponding to the OSD menu is used for indicating the position of the OSD menu on the screen of the target display apparatus when the rotation angle of the target display apparatus is the target rotation angle.

Step 204, sequentially determining, according to the preset rule, the target rotation angle, the target operation instruction and the attribute information corresponding to each of the target areas, the RGB value corresponding to each of the pixel points contained in the OSD menu; and Step 205, outputting and displaying the OSD menu according to the target position information corresponding to the OSD menu and the RGB value corresponding to each of the pixel points contained in the OSD menu.

Furthermore, the attribute information corresponding to the target area comprises a plurality of storage addresses corresponding to the target area; step 204, sequentially determining, according to preset rules, a target rotation angle, a target operation instruction and attribute information corresponding to each of the target areas, an RGB value corresponding to each of the pixel points contained in the OSD menu, comprising:

determining the target storage address corresponding to each of the pixel points contained in the OSD menu according to the target operation instruction and the plurality of storage addresses corresponding to each of the target areas;

determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and sequentially determining, according to the search order corresponding to each of the pixel points contained in the OSD menu and the target storage address, the RGB value corresponding to each of the pixel points contained in the OSD menu.

Furthermore, determining the target storage address corresponding to each of the pixel points contained in the OSD menu according to the target operation instruction and a plurality of storage addresses corresponding to each of the target areas comprises:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each of the target areas.

Furthermore, determining the search order corresponding to each of the pixel points contained in the OSD menu according to an initial arrangement order corresponding to the plurality of target areas, an initial arrangement order corresponding to the plurality of pixel points contained in each of the target areas and the target rotation angle comprises:

acquiring the initial arrangement order corresponding to the plurality of target areas and the initial arrangement order corresponding to the plurality of pixel points contained in each of the target areas;

determining a rotation arrangement order corresponding to the plurality of target areas according to the initial arrangement order corresponding to the plurality of target areas and the target rotation angle;

respectively determining the rotation arrangement order corresponding to the plurality of pixel points contained in each of the target areas according to the initial arrangement order and the target rotation angle corresponding to the plurality of pixel points contained in each of the target areas; and determining the search order corresponding to the multiple pixel points contained in the OSD menu according to the rotation arrangement order corresponding to the multiple target areas and the rotation arrangement order corresponding to the multiple pixel points contained in each of the target areas.

Furthermore, the attribute information corresponding to the target area also comprises a color bit depth value corresponding to the target area, and the attribute information set also comprises a color disk corresponding to each color bit depth value. Determining the search order and the target storage address corresponding to each of the pixel points contained in the OSD menu according to the target rotation angle, and sequentially determining a RGB value corresponding to each of the pixel points contained in the OSD menu comprises:

successively searching for a color numerical value corresponding to each of the pixel points contained in the OSD menu in a target random access memory, wherein, after searching for and obtaining a color numerical value corresponding to any one pixel point, a color disk corresponding to the target area to which the pixel point belongs is determined according to a color bit depth value corresponding to the target area to which the pixel point belongs, and the RGB value corresponding to the pixel point in the color disk corresponding to the target area to which the pixel point belongs is searched for according to the color numerical value corresponding to the pixel point.

The embodiment of the present application provides a display device and method for an OSD menu, and the display device for an OSD menu provided in the embodiment of the present application comprises: a receiving unit, a first determination unit, an acquisition unit, a second determination unit and an output display unit. Firstly, after a user presses a menu key of a target display apparatus, rotates the target display apparatus or performs other operations so as to generate a target operation instruction, the receiving unit receives the target operation instruction. Secondly, the first determination unit determines a target rotation angle corresponding to the target display apparatus. Thirdly, the acquisition unit acquires the attribute information set corresponding to the OSD menu in the attribute random access memory according to the target rotation angle corresponding to the target display apparatus. Fourthly, the second determination unit sequentially determines an RGB value corresponding to each of the pixel points contained in the OSD menu according to the preset rule, the target rotation angle corresponding to the target display apparatus, the received target operation instruction and the attribute information corresponding to each of the target areas contained in the attribute information set. Finally, the output display unit outputs and displays the OSD menu according to the target position information corresponding to the OSD menu and the RGB value corresponding to each of the pixel points contained in the OSD menu. In the embodiment of the present application, after the target display apparatus rotates, the display state of the OSD menu can be changed, so as to ensure that the display direction of the screen of the target display apparatus is consistent with the display direction of the OSD menu, and thus the user's use experience can be effectively improved.

An embodiment of the present application provides a storage medium comprising a stored program, wherein an apparatus on which the storage medium is located is controlled to execute the above-mentioned OSD menu display method when the program is executed.

The storage medium may comprise a form of non-persistent memory, random access memory (RAM), and/or non-volatile memory, such as read only memory (ROM) or flash memory (flash RAM), in a computer readable medium, the memory comprising at least one memory chip.

The embodiments of the present application also provide a display device for an OSD menu, the device comprising a storage medium; and one or more processors, the storage medium being coupled to the processors, the processors being configured to execute program instructions stored in the storage medium, the program instructions, when executed, performing the display method of the OSD menu described above.

An embodiment of the present application provides an apparatus, the apparatus comprising a processor, a memory and a program stored in the memory and executable on the processor, wherein when the processor executes the program, the following steps are implemented:

receiving a target operation instruction;

determining a target rotation angle corresponding to the target display apparatus;

acquiring an attribute information set corresponding to a OSD menu according to the target rotation angle, wherein the OSD menu contains a plurality of target areas, and each of the target areas contains a plurality of pixel points; the attribute information set comprises target position information corresponding to the OSD menu and attribute information corresponding to each of the target areas; the target position information corresponding to the OSD menu is used for indicating the position of the OSD menu in a screen of the target display apparatus when the rotation angle of the target display apparatus is the target rotation angle;

successively determining the RGB value corresponding to each of the pixel points contained in the OSD menu according to a preset rule, the target rotation angle, the target operation instruction and attribute information corresponding to each the target area; and outputting and displaying the OSD menu according to target position information corresponding to the OSD menu and the RGB value corresponding to each of the pixel points contained in the OSD menu.

Further, the attribute information corresponding to the target area comprises a plurality of storage addresses corresponding to the target area. Sequentially determining a RGB value corresponding to each of the pixel points contained in the OSD menu according to a preset rule, the target rotation angle, the target operation instruction and attribute information corresponding to each the target area, comprises:

determining the target storage address corresponding to each of the pixel points contained in the OSD menu according to the target operation instruction and the plurality of storage addresses corresponding to each the target area;

determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and Successively determining the RGB value corresponding to each of the pixel points contained in the OSD menu according to the search order corresponding to each of the pixel points contained in the OSD menu and the target storage address.

Furthermore, the determining a target storage address corresponding to each of the pixel points contained in the OSD menu according to the target operation instruction and the plurality of storage addresses corresponding to each the target area comprises:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each the target area.

Furthermore, the determining a search order corresponding to each of the pixel points contained in the OSD menu according to an initial arrangement order corresponding to the plurality of the target areas, an initial arrangement order corresponding to the plurality of pixel points contained in each the target area and the target rotation angle comprises:

acquiring the initial arrangement order corresponding to the plurality of the target areas and the initial arrangement order corresponding to the plurality of pixel points contained in each of the target areas;

determining a rotation arrangement order corresponding to a plurality of the target areas according to the initial arrangement order corresponding to the plurality of the target areas and the target rotation angle;

respectively determining the rotation arrangement order corresponding to the plurality of pixel points contained in each of the target areas according to the initial arrangement order corresponding to the plurality of pixel points contained in each of the target areas and the target rotation angle; and determining a search order corresponding to the plurality of pixel points contained in the OSD menu according to a rotation arrangement order corresponding to the plurality of the target areas and the rotation arrangement order corresponding to the plurality of pixel points contained in each of the target areas.

Furthermore, the attribute information corresponding to the target area also comprises a color bit depth value corresponding to the target area, and the attribute information set also comprises a color disk corresponding to each of the color bit depth values. The determining a search order and the target storage address corresponding to each of the pixel points contained in the OSD menu according to the target rotation angle, and sequentially determining the RGB value corresponding to each of the pixel points contained in the OSD menu comprises:

successively searching for a color numerical value corresponding to each of the pixel points contained in the OSD menu in a target random access memory according to the search order corresponding to each of the pixel points contained in the OSD menu and the target storage address, wherein after searching for and obtaining a color numerical value corresponding to any one pixel point, the color disk corresponding to the target area to which the pixel point belongs is determined according to a color bit depth value corresponding to the target area to which the pixel point belongs, and the RGB value corresponding to the pixel point in the color disk corresponding to the target area to which the pixel point belongs is searched for according to the color numerical value corresponding to the pixel point.

The present application also provides a computer program product adapted to execute, when executed on a data processing apparatuses, program code for initializing the following method steps: receiving a target operation instruction; determining a target rotation angle corresponding to the target display apparatus; acquiring an attribute information set corresponding to the OSD menu according to the target rotation angle, wherein the OSD menu contains the plurality of target areas, and each of the target areas contains the plurality of pixel points; the attribute information set comprises target position information corresponding to the OSD menu and attribute information corresponding to each of the target areas; the target position information corresponding to the OSD menu is used for indicating the position of the OSD menu in a screen of the target display apparatus when the rotation angle of the target display apparatus is the target rotation angle; successively determining the RGB value corresponding to each of the pixel points contained in the OSD menu according to a preset rule, the target rotation angle, the target operation instruction and attribute information corresponding to each the target area; and outputting and displaying the OSD menu according to target position information corresponding to the OSD menu and the RGB value corresponding to each of the pixel points contained in the OSD menu.

Those skilled in the art will appreciate that embodiments of the present application can be provided as a method, system, or computer program product. Accordingly, this application may take the form of an entirely hardware embodiment, an entirely software embodiment or an embodiment combining software and hardware aspects. Moreover, the present application can take the form of a computer program product embodied on one or more computer-usable storage medium (including, but not limited to, magnetic disk memory, CD-ROM, optical memory, etc.) having computer-usable program code embodied therein.

The present application is described with reference to flowchart illustrations and/or block diagrams of methods, apparatus (systems), and computer program products according to embodiments of the present application. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create device for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction device which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions executed on the computer or other programmable apparatus provide steps for implementing the functions specified in the flowchart flow or flows and/or block diagram block or blocks.

In a typical configuration, a computing apparatus includes one or more processors CPU, input/output interfaces, network interfaces, and memory.

The memory may include forms of non-persistent memory, random access memory (RAM), and/or non-volatile memory, such as read only memory (ROM) or flash memory (flash RAM), in a computer readable medium. Memory is an example of a computer readable medium.

Computer readable medium, including both permanent and non-permanent, removable and non-removable media, can implement information storage by any method or technology. The information may be computer readable instructions, data structures, circuits of a program, or other data. Examples of storage medium for a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic cassettes, tape magnetic disk storage or other magnetic storage apparatuses or any other non-transmission medium may be used to store information that may be accessed by a computing device. As defined herein, a computer readable medium does not include a transitory media, such as a modulated data signal and a carrier wave.

It should also be noted that the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by the phrase "comprises a . . . " does not, without more constraints, preclude the existence of additional identical elements in the process, method, article, or apparatus that comprises the element.

Those skilled in the art will appreciate that embodiments of the present application can be provided as a method, system, or computer program product. Accordingly, this application may take the form of an entirely hardware embodiment, an entirely software embodiment or an embodiment combining software and hardware aspects. Moreover, the present application can take the form of a computer program product embodied on one or more computer-usable storage medium (including, but not limited to, magnetic disk memory, CD-ROM, optical memory, etc.) having computer-usable program code embodied therein.

The foregoing is by way of example only and is not intended as limiting. It will be apparent to those skilled in the art that various modifications and variations can be made in the present application. Any modifications, equivalents, improvements, etc. that come within the spirit and scope of the present application fall within the scope of protection of claims of the present application.

The invention claimed is:

1. A display device of an OSD menu, wherein the display device of the OSD menu is used for outputting and displaying the OSD menu and applied to a control integrated circuit chip in a target display apparatus, the device comprising:

a receiving circuit for receiving a target operation instruction;

a first determination circuit for determining a target rotation angle corresponding to the target display apparatus;

an acquisition circuit for acquiring an attribute information set corresponding to the OSD menu according to the target rotation angle, the OSD menu containing a plurality of target areas, each of the target areas containing a plurality of pixel points, the attribute information set comprising target position information corresponding to the OSD menu and attribute information corresponding to each of the target areas, and the target position information corresponding to the OSD menu being used for indicating the position of the OSD menu in a screen of the target display apparatus when a rotation angle of the target display apparatus is the target rotation angle;

a second determination circuit for successively determining an RGB value corresponding to each of the pixel points contained in the OSD menu according to a preset rule, the target rotation angle, the target operation instruction and attribute information corresponding to each of the target areas; and an output display circuit for outputting and displaying the OSD menu according to the target position information corresponding to the OSD menu and the RGB value corresponding to each of the pixel points contained in the OSD menu.

2. The device according to claim 1, wherein the attribute information corresponding to the target area comprises a plurality of storage addresses corresponding to the target area; and the second determination circuit comprises:

a first determination module for determining a target storage address corresponding to each of the pixel points contained in the OSD menu according to the target operation instruction and the plurality of storage addresses corresponding to each of the target areas;

a second determination module for determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and a third determination module for sequentially determining the RGB value corresponding to each of the pixel points contained in the OSD menu according to the search order and the target storage address corresponding to each of the pixel points contained in the OSD menu.

3. The device according to claim 2, wherein the first determination module is specifically used for:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each of the target areas.

4. The device according to claim 2, wherein the second determination module is specifically used for:

acquiring the initial arrangement order corresponding to the plurality of target areas and the initial arrangement order corresponding to the plurality of pixel points contained in each of the target areas;

determining a rotation arrangement order corresponding to the plurality of target areas according to the initial arrangement order corresponding to the plurality of target areas and the target rotation angle;

respectively determining the rotation arrangement order corresponding to the plurality of pixel points contained in each of the target areas according to the initial arrangement order corresponding to the plurality of pixel points contained in each of the target areas and the target rotation angle; and determining the search order corresponding to the plurality of pixel points contained in the OSD menu according to the rotation arrangement order corresponding to the plurality of target areas and the rotation arrangement order corresponding to the plurality of pixel points contained in each of the target areas.

5. The device according to claim 2, wherein the attribute information corresponding to the target area further comprises a color bit depth value corresponding to the target area, and the attribute information set further comprises a color disk corresponding to each color bit depth value; and the third determination module is specifically used for:

successively searching for a color numerical value corresponding to each of the pixel points contained in the OSD menu in a target random access memory according to the search order and the target storage address corresponding to each of the pixel points contained in the OSD menu; and after searching for and obtaining the color numerical value corresponding to any of the pixel points, determining the color disk corresponding to the target area to which the pixel point belongs according to the color bit depth value corresponding to the target area to which the pixel point belongs, and searching for the RGB value corresponding to the pixel point in the color disk corresponding to the target area to which the pixel point belongs according to the color numerical value corresponding to the pixel point.

6. A display method of an OSD menu, which is applied to a target display apparatus, the method comprising:

a receiving circuit receiving a target operation instruction;

a first determination circuit determining a target rotation angle corresponding to the target display apparatus after the receiving circuit receiving the target operation instruction;

an acquisition circuit acquiring an attribute information set corresponding to the OSD menu according to the target rotation angle determined by the first determination circuit, the OSD menu containing a plurality of target areas, each of the target areas containing a plurality of pixel points, the attribute information set comprising target position information corresponding to the OSD menu and attribute information corresponding to each of the target areas, and the target position information corresponding to the OSD menu being used for indicating the position of the OSD menu in a screen of the target display apparatus when a rotation angle of the target display apparatus is the target rotation angle;

a second determination circuit successively determining an RGB value corresponding to each of the pixel points contained in the OSD menu according to a preset rule, the target rotation angle determined by the first determination circuit, the target operation instruction received by the receiving circuit and attribute information corresponding to each of the target areas acquired by the acquisition circuit; and an output display circuit outputting and displaying the OSD menu according to the target position information corresponding to the OSD menu acquired by the acquisition circuit and the RGB value corresponding to each of the pixel points contained in the OSD menu determined by the second determination circuit.

7. The method according to claim 6, wherein the attribute information corresponding to the target area comprises a plurality of storage addresses corresponding to the target area; and the successively determining an RGB value corresponding to each of the pixel points contained in the OSD menu according to a preset rule, the target rotation angle, the target operation instruction and attribute information corresponding to each of the target areas comprises:

determining a target storage address corresponding to each of the pixel points contained in the OSD menu according to the target operation instruction and the plurality of storage addresses corresponding to each of the target areas;

determining a search order corresponding to each of the pixel points contained in the OSD menu according to an initial arrangement order corresponding to the plurality of target areas, an initial arrangement order corresponding to the plurality of pixel points contained in each of the target areas and the target rotation angle; and sequentially determining the RGB value corresponding to each of the pixel points contained in the OSD menu according to the search order and the target storage address corresponding to each of the pixel points contained in the OSD menu.

8. The method according to claim 7, wherein the determining a target storage address corresponding to each of the pixel points contained in the OSD menu according to the target operation instruction and the plurality of storage addresses corresponding to each of the target areas comprises:

determining the target storage address corresponding to each of the target areas according to the target operation instruction and the plurality of storage addresses corresponding to each of the target areas; and determining the target storage address corresponding to each of the pixel points contained in the OSD menu according to the target storage address corresponding to each of the target areas.

9. The method according to claim 7, wherein the determining a search order corresponding to each of the pixel points contained in the OSD menu according to an initial arrangement order corresponding to the plurality of target areas, an initial arrangement order corresponding to the plurality of pixel points contained in each of the target areas and the target rotation angle comprises:

acquiring the initial arrangement order corresponding to the plurality of target areas and the initial arrangement order corresponding to the plurality of pixel points contained in each of the target areas;

determining a rotation arrangement order corresponding to the plurality of target areas according to the initial arrangement order corresponding to the plurality of target areas and the target rotation angle;

respectively determining the rotation arrangement order corresponding to the plurality of pixel points contained in each of the target areas according to the initial arrangement order corresponding to the plurality of pixel points contained in each of the target areas and the target rotation angle; and determining the search order corresponding to the plurality of pixel points contained in the OSD menu according to the rotation arrangement order corresponding to the plurality of target areas and the rotation arrangement order corresponding to the plurality of pixel points contained in each of the target areas.

10. The method according to claim 7, wherein the attribute information corresponding to the target area further comprises a color bit depth value corresponding to the target area, and the attribute information set further comprises a color disk corresponding to each color bit depth value; and the sequentially determining the RGB value corresponding to each of the pixel points contained in the OSD menu according to the search order and the target storage address, determined according to the target rotation angle, corresponding to each of the pixel points contained in the OSD menu comprises:

successively searching for a color numerical value corresponding to each of the pixel points contained in the OSD menu in a target random access memory according to the search order and the target storage address corresponding to each of the pixel points contained in the OSD menu; and after searching for and obtaining the color numerical value corresponding to any of the pixel points, determining the color disk corresponding to the target area to which the pixel point belongs according to the color bit depth value corresponding to the target area to which the pixel point belongs, and searching for the RGB value corresponding to the pixel point in the color disk corresponding to the target area to which the pixel point belongs according to the color numerical value corresponding to the pixel point.

11. A storage medium, comprising a stored program, an apparatus on which the storage medium is located being controlled to execute the display method of the OSD menu according to claim 6 when the program is operated.

12. A display device of an OSD menu, wherein the display device of the OSD menu is used for outputting and displaying the OSD menu and applied to a control integrated circuit chip in a target display apparatus, the device comprising a storage medium; and one or more processors, the storage medium being coupled to the processors, the processors being configured to execute program instructions stored in the storage medium, the program instructions, when operated, performing the display method of the OSD menu according to claim 6.

* * * * *